(12) United States Patent
Lattner et al.

(10) Patent No.: US 11,000,913 B2
(45) Date of Patent: May 11, 2021

(54) WELDING DEVICE WITH A LASER PREHEATER FOR FILLER WIRE

(71) Applicant: Fronius International GmbH, Pettenbach (AT)

(72) Inventors: Peter Lattner, Kematen am Innbach (AT); Herbert Staufer, Neuhofen (AT); Christian Krell, Vienna (AT)

(73) Assignee: Fronius International GmbH, Pettenbach (AT)

( * ) Notice: Subject to any disclaimer, the term of this patent is extended or adjusted under 35 U.S.C. 154(b) by 401 days.

(21) Appl. No.: 15/568,134

(22) PCT Filed: Feb. 22, 2017

(86) PCT No.: PCT/EP2017/054020
§ 371 (c)(1),
(2) Date: Oct. 20, 2017

(87) PCT Pub. No.: WO2017/144515
PCT Pub. Date: Aug. 31, 2017

(65) Prior Publication Data
US 2018/0085842 A1  Mar. 29, 2018

(30) Foreign Application Priority Data
Feb. 23, 2016 (EP) .................................. 16156979

(51) Int. Cl.
*B23K 9/10* (2006.01)
*B23K 26/348* (2014.01)

(52) U.S. Cl.
CPC .......... *B23K 9/1093* (2013.01); *B23K 26/348* (2015.10)

(58) Field of Classification Search
CPC ........ B23K 9/1093; B23K 9/133; B23K 9/26; B23K 26/346; B23K 26/348
See application file for complete search history.

(56) References Cited

U.S. PATENT DOCUMENTS 3,597,578 A * 8/1971 Sullivan ................. B23K 26/10
219/121.67
5,208,434 A * 5/1993 Minamida .............. B23K 26/06
219/121.6
(Continued)

FOREIGN PATENT DOCUMENTS

CN 104411439 A 3/2015
EP 2 777 858 A1 9/2014
(Continued)

OTHER PUBLICATIONS

Chinese First Office Action in Chinese Application No. 201780001268.9 dated Oct. 22, 2019.
(Continued)

*Primary Examiner* — Erin E McGrath
(74) *Attorney, Agent, or Firm* — Collard & Roe, P.C.

(57) ABSTRACT

The invention relates to a welding device (1) having a welding torch (2), a feeder (3) for feeding a melting filler material (4) at a feed rate (v) to a weld (S), where the filler material (4) is melted with the aid of an electric arc (L), and a pre-heater (9) for heating the filler material (4) upstream of the weld (S) by means of a laser beam (7) having a laser power (P) and generated in a laser device (6). For space-saving and safe heating of the filler material (4) upstream of the weld (S), the pre-heater (9) includes a feed channel (5) for the filler material (4), and at least one deflector (8) is attached to the pre-heater (9) for deflecting the laser beam (7) to the filler material (4) in such a way that the laser beam (7) strikes the filler material (4) inside the feed channel (5) of the pre-heater (9).

14 Claims, 3 Drawing Sheets

(56) References Cited

U.S. PATENT DOCUMENTS

| | | | | |
|---|---|---|---|---|
| 5,961,862 | A * | 10/1999 | Lewis | B23K 26/144 |
| | | | | 219/121.63 |
| 6,127,651 | A * | 10/2000 | Burgoon | B23K 9/1093 |
| | | | | 219/137 R |
| 6,191,379 | B1 * | 2/2001 | Offer | B23K 9/0213 |
| | | | | 219/121.63 |
| 2002/0017509 | A1 * | 2/2002 | Ishide | B23K 26/0604 |
| | | | | 219/121.63 |
| 2002/0117485 | A1 | 8/2002 | Jones et al. | |
| 2008/0009129 | A1 * | 1/2008 | Subido | B23K 20/007 |
| | | | | 438/612 |
| 2014/0008334 | A1 * | 1/2014 | Ash | B23K 26/20 |
| | | | | 219/121.64 |
| 2014/0042131 | A1 | 2/2014 | Ash | |
| 2017/0165778 | A1 * | 6/2017 | Hsu | B23K 9/24 |

FOREIGN PATENT DOCUMENTS

| | | |
|---|---|---|
| JP | 2005-224837 A | 8/2005 |
| SU | 1166943 A1 | 7/1985 |
| WO | 2014/006488 A2 | 1/2014 |

OTHER PUBLICATIONS

Chinese First Search in Chinese Application No. 201780001268.9 dated Oct. 11, 2019.
European Office Action dated Jul. 27, 2016 in European Application No. 16156979.3 with English translation of relevant parts.
International Search Report of PCT/EP2017/054020, dated Mar. 30, 2017.

* cited by examiner

WELDING DEVICE WITH A LASER PREHEATER FOR FILLER WIRE

CROSS REFERENCE TO RELATED APPLICATIONS

This application is the National Stage of PCT/EP2017/054020 filed on Feb. 22, 2017, which claims priority under 35 U.S.C. § 119 of European Application No. 16156979.3 filed on Feb. 23, 2016, the disclosure of which is incorporated by reference. The international application under PCT article 21(2) was not published in English.

The invention relates to a welding device having a welding torch, a feeder for feeding a melting filler material at a feed rate to a weld, where the filler material is melted with the aid of an electric arc, and a pre-heater for heating the filler material upstream of the weld by means of a laser beam having a laser power and generated in a laser device.

Welding devices of the present type are known, heating the filler material or consumable with the aid of a laser beam in order to improve the melting performance of the filler material and increase productivity. WO 2014/006488 A2, for example, describes such a method and system, in which the laser beam is directed to the weld without shielding. A disadvantage here is that in such a system the relevant guidelines concerning laser safety must be adhered to, so the system is not suited for manual welding torches.

Other devices for heating the filler material apply alternating current to it, with the power dissipation leading to a heating of the filler material. EP 2 777 858 A1, for example, describes such a heating device for heating a filler material in arc welding. A disadvantage here is that the alternating current used for heating generates a magnetic field which repels and/or attracts the welding arc and thus affects the welding point.

The object of the present invention is to provide a welding device as mentioned above, allowing a heating of the filler material with the aid of the laser beam without having to take certain safety measures due to the laser light. The heating of the filler material is to be as efficient and effective as possible. Disadvantages of known welding devices are to be eliminated or at least reduced.

The object according to the invention is achieved by the pre-heater including a feed channel for the filler material, and by at least one deflector for deflecting the laser beam to the filler material being attached to the pre-heater in such a way that the laser beam strikes the filler material inside the feed channel of the pre-heater. The at least one deflector used makes it possible to arrange the laser device at a suitable location of the welding device and to direct the laser light to the desired location on the filler material by means of the deflector. Since the laser beam strikes the filler material inside the feed channel of the pre-heater in which it is fed, the laser beam is kept within a closed system, so no safety precautions to prevent laser light from reaching the eyes of the user need to be taken. The features according to the invention may be arranged in a relatively simple and economical manner on existing welding devices as well, so a wide range of applications is possible. By heating the filler material, the melting performance of the filler material is improved, allowing a better gap bridgeability or a higher welding speed.

The simplest way to provide the at least one deflector is using a mirror. Both planar and bent mirrors are conceivable, depending on whether the laser beam should be focussed or fanned out.

In a similar manner the at least one deflector may be formed by a prism. The reflection surface for deflecting the laser beam may be flat or curved with the prism as well, depending on whether the laser beam should be focussed or fanned out.

By providing at least one lens upstream of downstream of the at least one deflector, the laser beam may be concentrated or collimated. Such a lens may be provided instead of or in addition to a curved mirror or prism, so the diameter of the light spot striking the filler material in order to heat it may be adjusted. Depending on the arrangement of the lens, the focus of the laser beam may be adjusted and optimised. Typically, such lenses are made of glass or a derivative material of glass.

For deflecting the laser beam to the filler material, the at least one deflector is preferably formed at a distance of between 0.5 and 8 cm, in particular 1 and 3 cm, from the weld. These values have proven to be particularly preferred since the heating spot should not be located too close to the weld in order to allow the heat to spread within the filler material, but should also not be located too far from the weld in order to prevent a cooling of the filler material during transport to the weld. The lower boundary of the preferred range is established mainly by constructional requirements. In TIG welding, for example, the preferred distance is between 1 and 3 cm, in MIG/MAG welding between 3 and 5 cm.

Preferably, an optical waveguide is arranged between the laser device and the at least one deflector. By using such an optical waveguide, the laser light may be transported from the laser device to the deflector without considerable power losses even over longer distances, so there is no need to significantly increase the size of the construction in the region of the weld. For example, the laser device may be arranged in the region of the power supply of the welding device and the laser light may be transported to the welding torch via the optical waveguide. The deflector may also be formed integral with the optical waveguide. This may lead to simplifications in the construction and provide a deflector to be produced in a simple manner.

By arranging the at least one deflector movably, various improvements and effects may be obtained. For example, the striking spot of the laser beam on the surface of the filler material may be changed to obtain a uniform heating of the filler material. The laser light might be moved around the central line of the filler material in an oscillating motion. The motion may be effected by appropriate devices such as stepper motors.

For deflecting the laser beam, the at least one deflector may be formed at an angle of between 45° and 90° to the feeding direction of the filler material. Directing the laser light to the filler material at an oblique angle to the feeding direction thereof results in a larger striking spot and/or a larger striking area of the laser light on the filler material and thus in a larger heating area than when using a right angle. This may lead to a more uniform heating of the filler material. Selecting an angle slightly deviating from the right angle has also proven to be advantageous since this may prevent a reflection of the laser light from the surface of the filler material back into the deflector. For example, the laser light may be deflected at an angle of 78° to 89° to the feeding direction of the filler material.

Polishing the surface of the feed channel for the filler material may result in losing virtually no laser light because of absorption on the surface of the feed channel, but ultimately the major portion may strike the filler material and contribute to heating the same due to multiple reflections from the surface of the feed channel. Depending on the material used for the feeder, in which the feed channel is arranged, different techniques for polishing the surface of the feed channel will be required. Certain coatings of the surface of the feed channel are also possible to obtain a reflection of the laser light as high as possible.

The pre-heater may be integrated in the welding torch of the welding device. This hardly affects the size of the welding torch's construction and allows the welder to handle the welding torch as usual.

For cooling the at least one deflector and/or the pre-heater, a cooling device may be provided. Preferably, the cooling of the deflector and the pre-heater is done by respective appropriate cooling fluids, in particular cooling liquids. Corresponding cooling ducts for transporting the cooling fluid may be provided in the deflector and/or the pre-heater.

According to another feature of the invention, a controller is provided for controlling the laser power depending on the feed rate of the filler material and/or for controlling the feed rate of the filler material depending on the laser power. Using such a controller guarantees that the laser power required for the desired heating of the filler material is introduced into the filler material, irrespective of the feed rate of the filler material. Of course, the controller may also be formed by the controller of the welding device, which is present in any case.

Ideally, the laser power is between 10 W and 2 kW. Such laser powers have been found to be suitable and/or sufficient for an efficient heating of the filler material in welding. The laser device may be designed to generate a pulsed or a continuous laser beam.

By providing a temperature sensor, both a regulation of the laser power to reach a desired temperature and a warning in case of unacceptably high temperatures in the region of the deflector or the feed channel of the feeder may be obtained. The temperature sensor may be arranged in the pre-heater near the feed channel or at the outlet of the feed channel.

Preferably the laser device is designed to generate a laser beam in the infrared wavelength range. Infrared lasers are particularly suited for heating the filler material and economically available in various power ratings. Depending on the material of the filler material, however, other wavelength ranges of the laser may be advantageous.

The invention is explained in more detail by means of the enclosed drawings. In the drawings.

Figure 1:
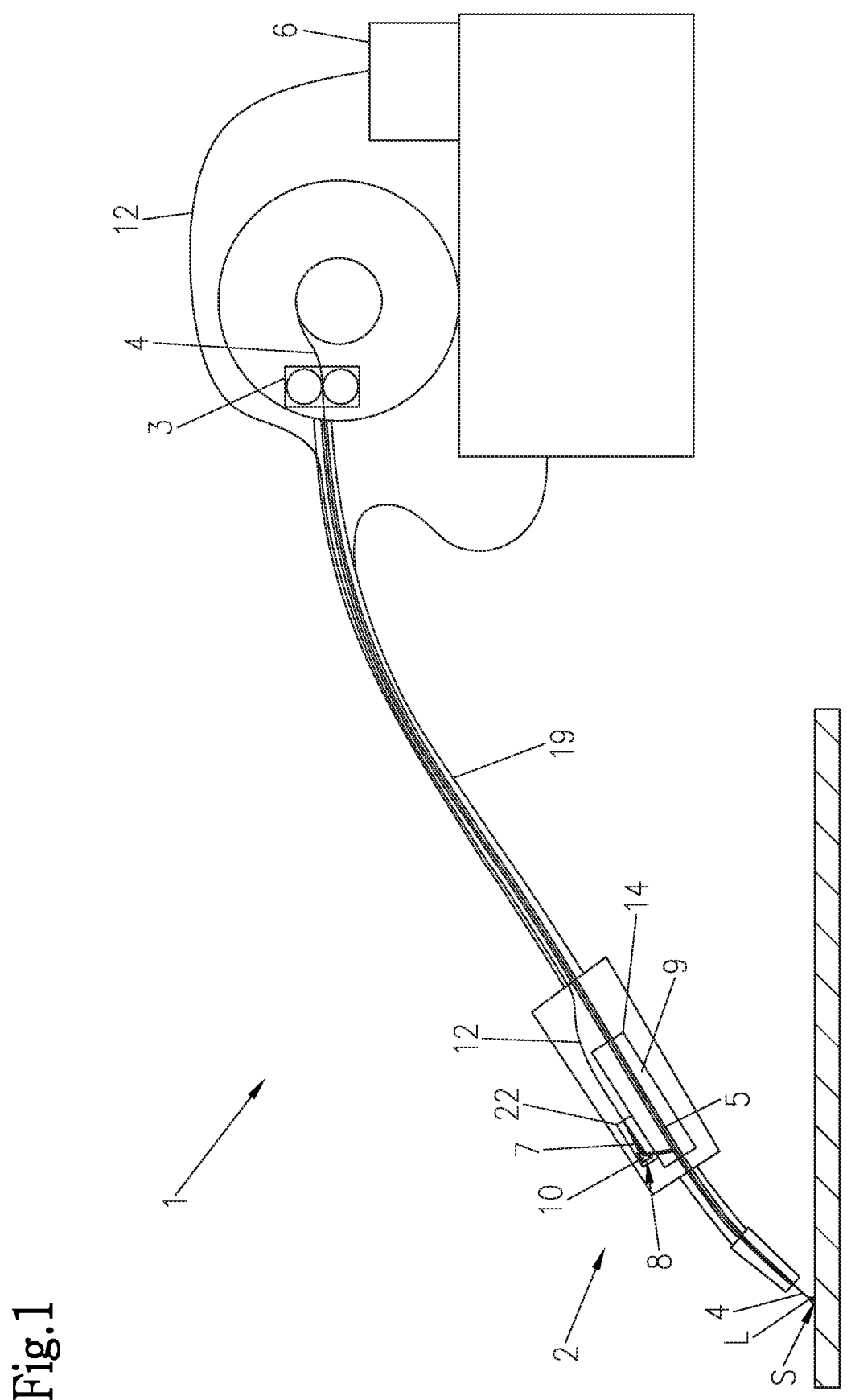
FIG. 1 shows a schematic view of a pre-heater for heating the filler material, integrated in a welding torch.

FIG. 1 shows a schematic view of a pre-heater 9 for heating the filler material 4, in particular a welding wire, integrated in a welding torch 2 of a welding device 1. The filler material 4 is transported to the weld S through a hose package 19 by a feeder 3 at a feed rate v. The hose package 19 also includes the lines for further media required for the welding process such as current, gas, cooling fluid etc. A laser device 6 for generating a laser beam 7 having a laser power P is arranged at a suitable location. The laser light 7 is transported, preferably via an optical waveguide 12, from the laser device 6 to a deflector 8 of the pre-heater 9, where the laser beam 7 is deflected and directed to the filler material 4 inside a feed channel 5 of the pre-heater 9. In the exemplary embodiment shown, the deflector 8 is formed by a prism 10. Accordingly, the laser beam 7 is guided substantially parallel to the filler material 4 in the region of the pre-heater 9 and deflected by an angle (180°−α) via the prism 10. The components of the deflector 8 are arranged within a housing 22, to which the optical waveguide 12, for example, may be attached. In an alternative compact embodiment the optical waveguide 12 may also be attached to the pre-heater 9, and the deflector 8 may be formed by the optical waveguide 12, in which the laser beam 7 is deflected multiple times. Since the laser beam 7 is transported in a closed system only inside the pre-heater 9 and possibly through the optical waveguide 12, no safety measures for meeting the laser guidelines are required. As the laser beam 7 strikes the filler material 4, it is heated accordingly, thus allowing to improve the melting performance of the filler material 4 at the weld S. Here, temperatures in the range between 700 K and 1000 K in the region of the striking spot of the laser beam 7 and temperatures in the range between 500 K and 900 K at the backside of the striking spot of the laser beam 7 have been found to be particularly suited, depending on the material of the filler material 4. This results in temperatures of the filler material 4 from 500 K to 1000 K in the region of the weld S. Distances Δx between the striking spot of the laser beam 7 on the filler material 4 and the weld S in the range between 0.5 and 8 cm, in particular 1 and 3 cm, have proven to be ideal. The ideal distance Δx depends on the welding method, for example the MIG/MAG or the TIG method.

The laser device 6 may be designed to generate a pulsed or a continuous laser beam 7, in particular in the infrared wavelength range.

In order to obtain a reflection of the laser light as good as possible on the surface of the feed channel 5 of the pre-heater 9, it may be polished or provided with an appropriate coating. The pre-heater 9 may include a housing 14, in particular one made of metal or ceramic.

Figure 2:
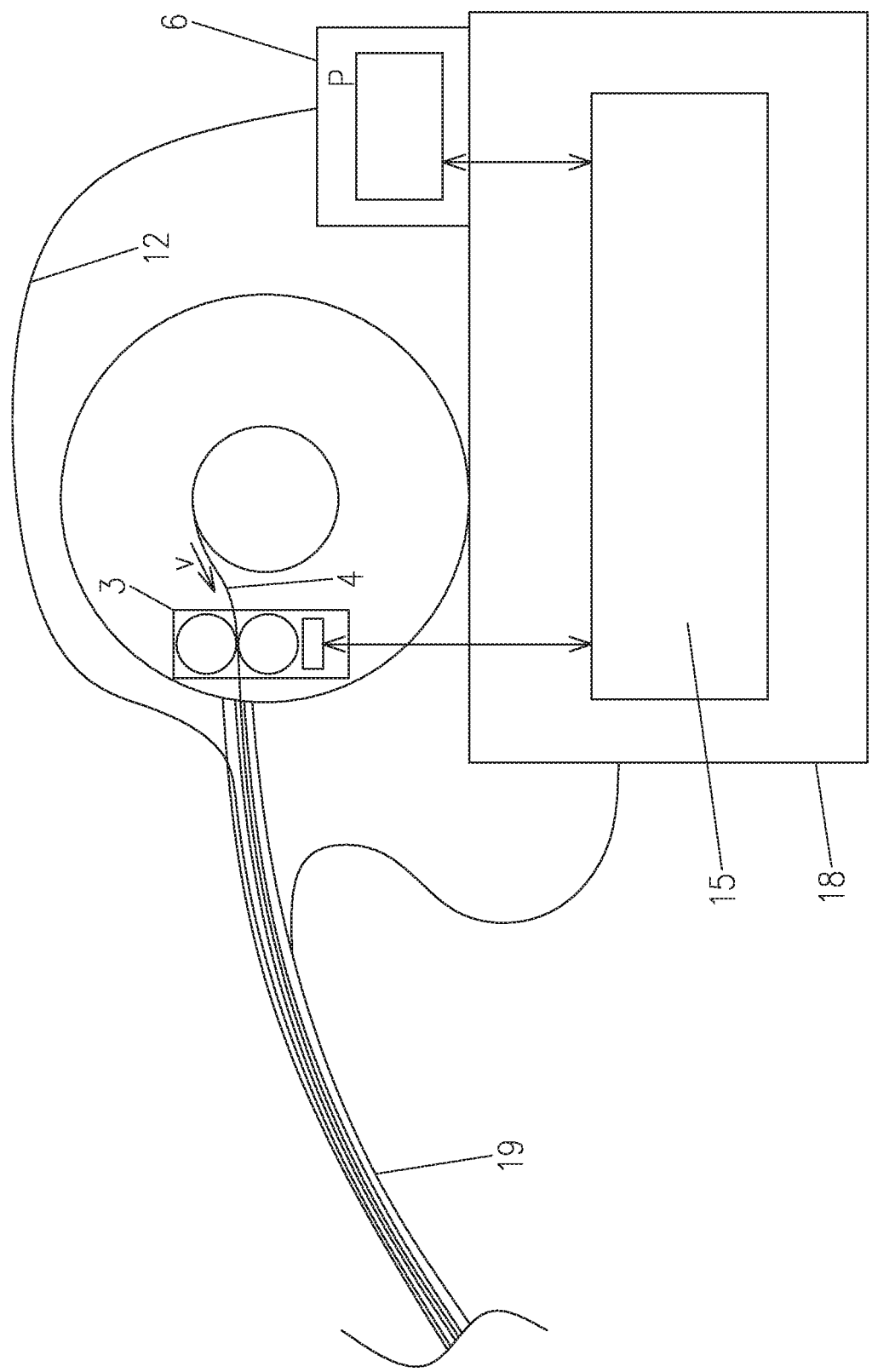
FIG. 2 shows a block diagram of a controller for controlling the laser power depending on the feed rate of the filler material.

FIG. 2 shows a block diagram of a controller 15 for controlling the laser power P depending on the feed rate v of the filler material 4 and/or vice versa. The controller 15 may be arranged in the power supply 18 of the welding device 1 and is formed by an appropriate microprocessor, which may also be formed by the microprocessor of the welding device 1, which is present in any case. By processing the laser power P, on the one hand, and the feed rate v of the filler material 4, on the other hand, an appropriate regulation of one parameter at a time is made possible.

Figure 3:
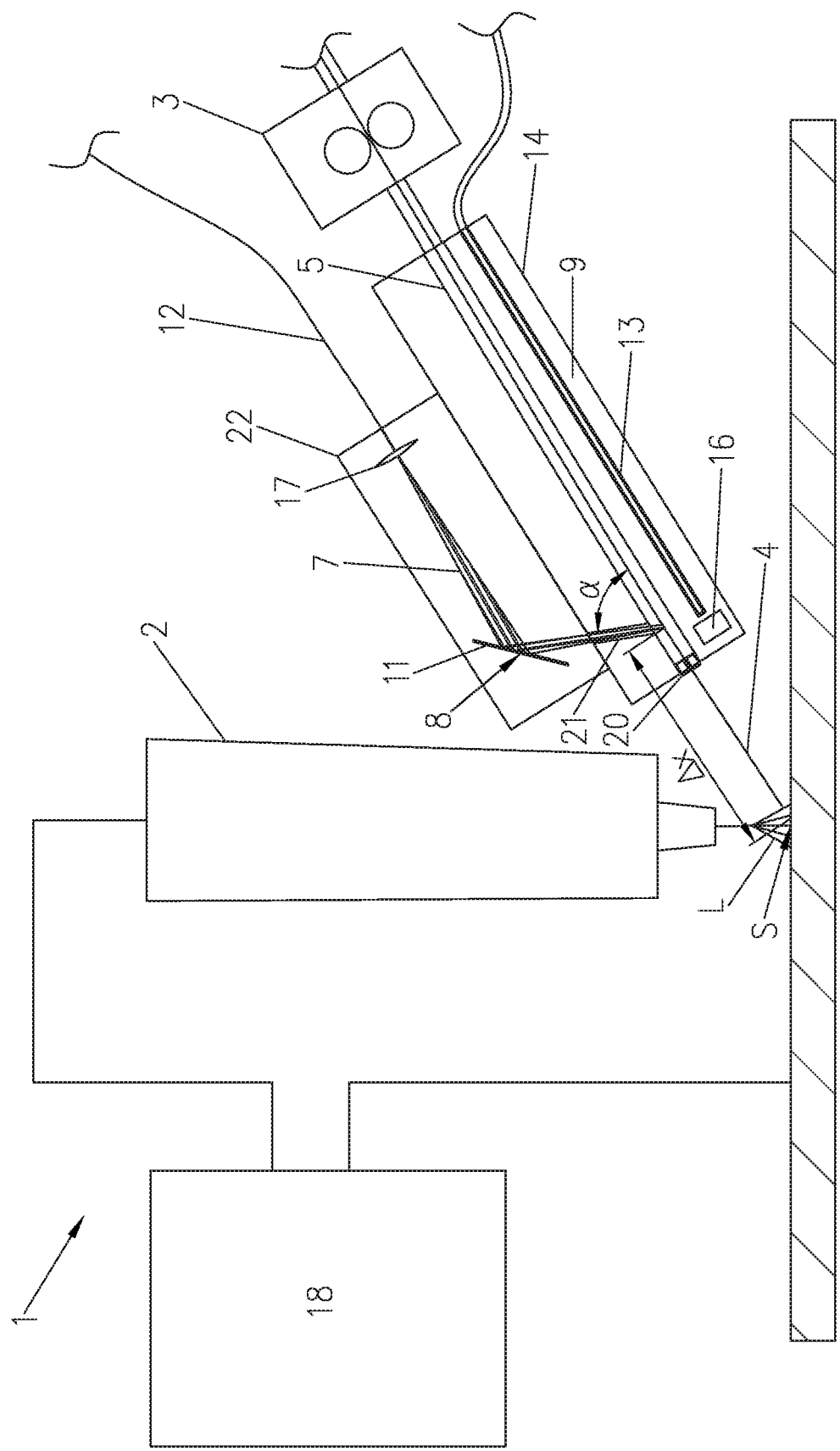
FIG. 3 shows a variation of a pre-heater having the deflector for the laser beam designed according to the invention.

FIG. 3 illustrates an alternative embodiment variation of a pre-heater 9 having the deflector 8 for the laser beam 7 designed according to the invention. The pre-heater 9 is not integrated in the welding torch 2 of the welding device 1 with the power supply 18, but constitutes an independent unit of its own. This variation will be used in welding devices 1 in which the filler material 4 or the welding wire is not fed to the weld S by the welding torch, for example in TIG welding. The pre-heater 9 is designed cylindrically shaped, for example, and the feed channel 5 is arranged axially in the centre of the cylinder. For the introduction of the laser beam 7, at least one radially arranged opening is provided, for example a bore 21, constituting the connection between the deflector 8 and the pre-heater 9. The opening may also be designed such that multiple striking areas on the filler material 4 may be obtained, which may be put into practice by multiple bores 21. Here, the laser beam 7 is split up, for example by a suitable prism, and one partial laser beam each is directed from the deflector 8 arranged on the outside of the pre-heater 9 to the surface of the filler material 4 through a respective bore 21 (not illustrated).

The at least one deflector 8 may also be formed by a mirror 11. A lens 17 for concentrating or collimating the laser beam 7 may be provided upstream and downstream of the deflector 8. For the laser beam 7 it is advantageous not to be directed to the filler material 4 at a right angle, but deviating slightly therefrom by about 1° to 3°, so a reflection of the laser light from the surface of the filler material 4 back into the deflector 8 may be prevented. In order to obtain a larger striking spot and/or striking area on the surface of the filler material 4, the laser beam 7 may also be directed to the surface of the filler material 4 at a more acute angle α, for example from 45° to 60°. The bore 21 for forming the opening is arranged correspondingly flush with the laser beam 7 in the direction of the desired striking area on the surface of the filler material 4.

Movably arranged deflectors 8 allow to obtain a change of the striking spot of the laser beam 7 on the filler material 4 and thus a more uniform heating of the filler material 4. In this case, the diameter of the bore 21 is designed correspondingly larger for guiding the laser beam 7.

By using an appropriate cooling device 13, the deflector 8 and/or the pre-heater 9 may be cooled by suitable cooling fluids. At least one temperature sensor 16 for regulation may be arranged and/or integrated at suitable locations. In addition, corresponding cooling ducts are provided in the pre-heater 9 and/or the deflector 8.

To prevent a leaking of laser light from the pre-heater 9, an appropriately designed sealing element 20 may be arranged at the end of the feed channel 5.

The pre-heater 9 may, for example, also include a duct for a shielding gas and/or be made of an electrically conductive material, so the welding current may be guided to a contact pipe of the welding torch 2 via the pre-heater 9. For this purpose, the pre-heater 9 may also include a receiving element, for example a thread, for the contact pipe or a pipe elbow of the welding torch 2 (not illustrated).

The welding torch 2 may also include a gas nozzle, in which the pre-heater 9 and the deflector 8 may be integrated. This makes it possible to shorten the distance Δx between the striking spot or the striking area of the laser beam 7 on the filler material 4 and the weld S.

The invention claimed is:

1. A welding device having
    a welding torch,
    a feeder for feeding a melting filler material at a feed rate to a weld, where the welding torch is configured to melt the filler material during a welding process with the aid of an electric arc,
    a pre-heater for heating the filler material upstream of the weld by means of a laser beam having a laser power and generated in a laser device, and
    a hose package comprising lines for current, gas, and cooling fluid required for the welding process, wherein the pre-heater is integrated in the welding torch and the filler material is transported to the weld through the hose package by the feeder,
    wherein the pre-heater includes a feed channel for the filler material, and at least one deflector for deflecting the laser beam to the filler material is attached to the pre-heater in such a way that the laser beam is kept within a closed system and strikes the filler material inside the feed channel of the pre-heater.

2. The welding device according to claim 1, wherein the at least one deflector is formed by a mirror.

3. The welding device according to claim 1, wherein the at least one deflector is formed by a prism.

4. The welding device according to claim 1, wherein at least one lens is provided for concentrating or collimating the laser beam.

5. The welding device according to claim 1, wherein for deflecting the laser beam to the filler material the at least one deflector is formed at a distance of between 0.5 and 8 cm from the weld.

6. The welding device according to claim 1, wherein an optical waveguide is arranged between the laser device and the at least one deflector.

7. The welding device according to claim 1, wherein the at least one deflector is arranged movably.

8. The welding device according to claim 1, wherein for deflecting the laser beam the at least one deflector is formed at an angle of between 45° and 90° to the feeding direction of the filler material.

9. The welding device according to claim 1, wherein a surface of the feed channel for the filler material is polished.

10. The welding device according to claim 1, wherein for cooling the at least one deflector and/or the pre-heater a cooling device is provided, wherein the cooling device comprises a cooling duct or ducts for transporting cooling fluid provided in the deflector and/or the pre-heater.

11. The welding device according to claim 1, wherein a controller is provided for controlling the laser power depending on the feed rate of the filler material and/or for controlling the feed rate of the filler material depending on the laser power.

12. The welding device according to claim 1, wherein the laser power is between 10 W and 2 kW.

13. The welding device according to claim 1, further comprising a temperature sensor arranged in the pre-heater.

14. The welding device according to claim 1, wherein the laser device is designed to generate a laser beam with an infrared wavelength.

* * * * *